(12) United States Patent
Wang et al.

(10) Patent No.: US 7,100,453 B2
(45) Date of Patent: *Sep. 5, 2006

(54) MODIFIED DUAL DIAPHRAGM PRESSURE SENSOR

(75) Inventors: Tzu-Yu Wang, Maple Grove, MN (US); Eugen I Cabuz, Edina, MN (US)

(73) Assignee: Honeywell International Inc., Morristown, NJ (US)

( * ) Notice: Subject to any disclaimer, the term of this patent is extended or adjusted under 35 U.S.C. 154(b) by 94 days.

This patent is subject to a terminal disclaimer.

(21) Appl. No.: 10/915,870

(22) Filed: Aug. 9, 2004

(65) Prior Publication Data

US 2005/0139007 A1 Jun. 30, 2005

Related U.S. Application Data

(63) Continuation-in-part of application No. 10/748,817, filed on Dec. 30, 2003, now Pat. No. 6,886,410.

(51) Int. Cl.
*G01L 7/08* (2006.01)

(52) U.S. Cl. .......................................... 73/715; 73/724

(58) Field of Classification Search ........... 73/700–756
See application file for complete search history.

(56) References Cited

U.S. PATENT DOCUMENTS

| 2,195,792 | A | | 4/1940 | Straatveit |
| 4,287,553 | A | * | 9/1981 | Braunlich ................. 361/283.4 |
| 4,336,567 | A | | 6/1982 | Anastasia |
| 4,754,365 | A | | 6/1988 | Kazahaya |
| 5,277,068 | A | | 1/1994 | Fukiura et al. |
| 5,679,902 | A | | 10/1997 | Ryhanen |
| 6,179,586 | B1 | * | 1/2001 | Herb et al. ................. 417/480 |
| 6,886,410 | B1 | * | 5/2005 | Wang et al. ................... 73/718 |
| 2002/0013545 | A1 | | 1/2002 | Solt anpour |
| 2002/0086149 | A1 | | 7/2002 | Swartz et al. |
| 2002/0103412 | A1 | | 8/2002 | Trimmer |
| 2003/0005774 | A1 | | 1/2003 | Suzuki et al. |
| 2003/0031572 | A1 | | 2/2003 | Tearle |

FOREIGN PATENT DOCUMENTS

WO    WO 00/28215    5/2000

* cited by examiner

*Primary Examiner*—Edward Lefkowitz
*Assistant Examiner*—Jermaine Jenkins
(74) *Attorney, Agent, or Firm*—Kris T. Fredrick

(57) ABSTRACT

A device for sensing pressure using two flexible diaphragms in which an additional element is added to promote rolling contact of the diaphragm. One embodiment aligns the flexible diaphragms in a non-parallel alignment such that deflection of one flexible diaphragm will roll with respect to the other to provide increased linear capacitive response. In another embodiment a non-conductive spacing element is positioned between the diaphragms to permit rolling contact upon displacement of a diaphragms. These devices are capacitive pressure gauges. One additional embodiment includes a cantilever hinge and rigid polymer disc to convert one diaphragm into a linearly deflecting diaphragm.

20 Claims, 3 Drawing Sheets

MODIFIED DUAL DIAPHRAGM PRESSURE SENSOR

This is a continuation-in-part of a prior application filed on Dec. 30, 2003, having Ser. No. 10/748,817 now U.S. Pat. No. 6,886,410, which is incorporated herein by reference in its entirety.

FIELD OF THE INVENTION

The present invention relates in general to pressure sensor technology and, more particularly, to low cost pressure sensors for either disposable or high volume applications of pressure sensors for gas and liquid based pressure sensing with increased sensitivity, improved linearity, and even lower cost.

BACKGROUND OF THE INVENTION

Modern industrial, commercial, aerospace and military systems depend critically on reliable pumps for fluid handling. Both gas and liquid fluids take advantage of smaller, more distributed and more portable systems for increasing uses in instrumentation and control. An improved electrostatic pump has been developed, as described in U.S. Pat. No. 6,179,586. In this patent, the pump consists of a single molded plastic chamber with two thin diaphragms stacked directly on top of each other. The diaphragms are actuated, depending on design, with electrostatic, electromagnetic or piezoelectric methods. This patent describes the use of a single chamber for pumping.

Out of this technology has come a need for improved pressure sensors that can use the speed and efficiency of the multiple diaphragm operation from a single molded plastic chamber. However, to make a pressure sensor operate optimally, the response to pressure changes should be as linear as possible.

It would be of great advantage if a pressure sensors using mesopump construction would have improved sensitivity.

Another advantage would be if a pressure sensors using mesopump construction would have increased linearization.

Yet another advantage would be if mesopump technology could be modified to be produced at less cost for use both as sensors and valves.

Other advantages and features will appear hereinafter.

SUMMARY OF THE INVENTION

The present invention provides improvements in low cost, effective meso-pressure sensors that are capable of measuring both positive and negative pressure, depending upon how the device is configured. It is made from inexpensive, injection molded plastics and plastic films that are readily available from many commercial sources.

The sensors include a sealed chamber defining part, a first flexible diaphragm mounted on one side in communication with the sealed chamber and a second flexible diaphragm separated from the first diaphragm by an insulator. A sensor chamber defining part is mounted on the other side of the second diaphragm for communication with a sensing atmosphere.

In an embodiment of the present invention, the first and second flexible diaphragms are mounted in a non-parallel alignment with each other, deflection of one flexible diaphragm will roll with respect to the other to provide increased linear capacitive response. In an alternative embodiment, a non-conductive spacer element is positioned between the diaphragms to separate them while permitting rolling contact upon displacement of at least one of the diaphragms. In both embodiments, the spacer, whether in the middle or at the periphery, causes the contact between the diaphragms to roll with respect to each other to provide a linear response. In another embodiment, a cantilever hinge and tab of a rigid polymer disc is mounted in the chamber between the first flexible diaphragm and the chamber to thereby convert the first flexible diaphragm into a linearly deflecting diaphragm.

BRIEF DESCRIPTION OF THE DRAWINGS

For a more complete understanding of the invention, reference is hereby made to the drawings, in which: invention as non-parallel diaphragms sensor.

In the figures, like reference characters designate identical or corresponding components and units throughout the several views.

DETAILED DESCRIPTION OF THE PREFERRED EMBODIMENT

All of the pressure sensors of this invention have elements disclosed in a prior, commonly owned application by the same inventors and filed on Dec. 30, 2003, having Ser. No. 10/748,817, which has been incorporated herein above by reference in its entirety. The sensor includes a sealed chamber defining part and a first flexible diaphragm having two sides and mounted on one side in communication with the chamber in the sealed chamber defining part. A first flexible diaphragm has a conductive surface and an insulator is mounted on the other side of the first flexible diaphragm. A second flexible diaphragm having two sides is mounted on one side in communication with the insulator. The second flexible diaphragm also has a conductive surface and is in communication with a sensor chamber defining part mounted on the other side of the second flexible diaphragm, which chamber has an opening for communication with a sensing atmosphere. Measurement of the capacitance between the diaphragms is a function of the pressure in the sensor chamber introduced through the opening and causing the one flexible diaphragms to move with respect to the other of the flexible diaphragms.

Figure 1:
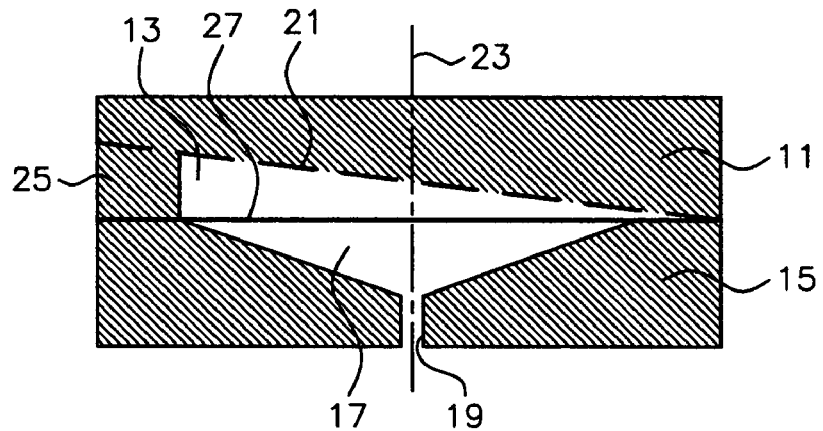

Referring to the figures, FIG. 1 illustrates a pressure sensor 10 generally that has an upper chamber forming element 11 defining closed chamber 13 and a lower chamber forming element 15, to define an open chamber 17, having port 19. The chamber defining elements 11 and 17 may be made from plastic or other nonconductive materials and may be molded or fabricated. Neither part 11 or 17 has any metallization or other patterning. An upper diaphragm 21 is mounted on the closed chamber forming element 13 and is spaced at an angle with respect to a vertical axis 23 by spacer 25.

Diaphragm 21 may be a plastic film with metallization or a dielectric film. Diaphragm 21 may be perforated and remains rigid curing operation. A lower diaphragm 27 is mounted on the lower chamber forming element 15 and on the other side of spacer 25. Diaphragm 27 may be a plastic film, either with metallization or formed from dielectric film and forms sealed cavity or closed chamber 13. Spacer 25 is also preferably made from plastic and contains no metallization. Spacer 25 separates diaphragms 21 and 27 at an angle with respect to axis 25. Since diaphragm 27 is flexible, pressure in open chamber 17 will cause it to have increased contact with diaphragm 21, thus providing a linear pressure sensor.

Figure 2:
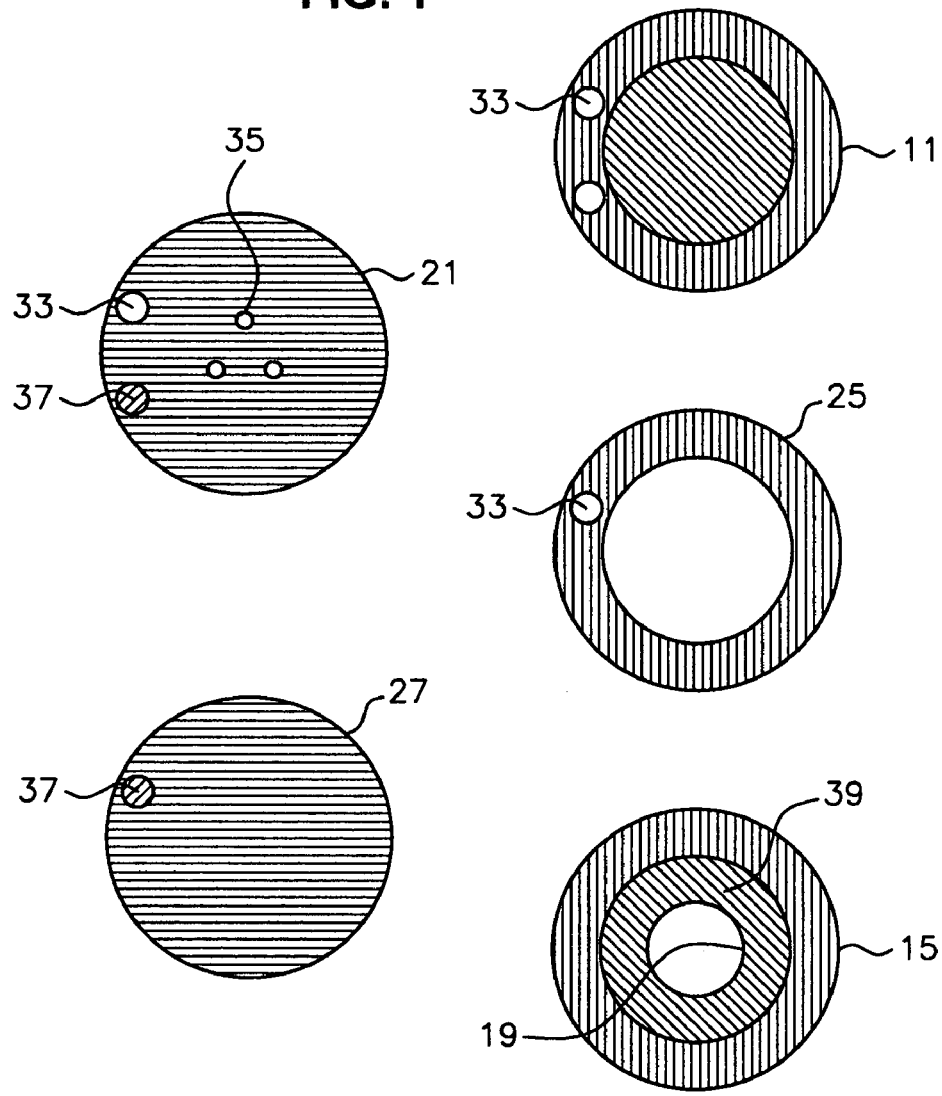
FIG. 2 is an exploded plan view of the embodiment shown in FIG. 1.

FIG. 2 is an exploded view of the parts of FIG. 1, shown in plan view. Upper chamber forming element 11 includes a cavity or backstop 31 and holes 33 which are open for electrical contact elements 36. Diaphragm 21 includes hole 33 for electrical contact, and may have holes 35 and does include a contact point 37. Spacer 25, which is pie shaped as shown in section in FIG. 1 and in plan view in FIG. 2, also has a hole 33 for electrical contact. Diaphragm 27 is not perforated and has contact point 37 for contact with elements 36. Finally, lower chamber defining element 15 provides pressure access via port 19 and includes cavity 39. In an optional embodiment, chamber 15 may be replaced by a ring or other mounting means for mounting diaphragm 27 to spacer 25.

As can be appreciated, the device of FIGS. 1 and 2 provides for linear diaphragm deflection by initially setting one diaphragm at an angle to the other. When the deforming diaphragm deflects, it will roll along the other diaphragm, creating a more linear capacitive response than prior designs.

Figure 3:
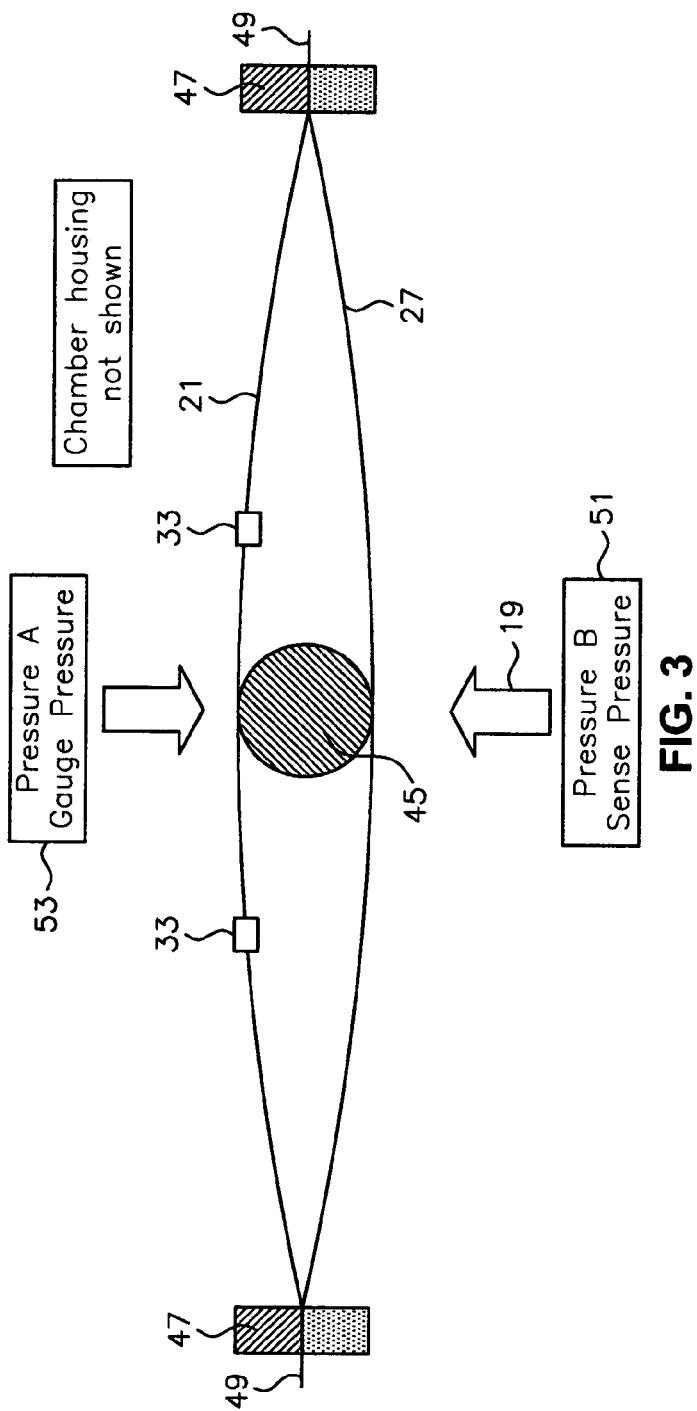
FIG. 3 is a side elevational view, in section, of another embodiment of the present invention as a dual diaphragm sensor.

In FIG. 3, additional elements of the present invention are shown. Instead of spacer 25 of FIG. 1, a spacer element 45 is mounted between diaphragms 21 and 27 which are mounted on their respective peripheral edges by mounting elements 47 and include electrical contacts 49. Upper chamber element 11 and lower chamber element 15 are not shown in this view for simplicity of explanation. Spacer 45 is a nonconductive element of any shape, such as spherical or cubical, and may be a patterned SU8 pillar. Spacer 45 is molded or otherwise formed. Operation is the same as in FIG. 1, however, as pressure from pressure source 51 causes lower diaphragm 27 to deflect, once again causing a more linear capacitive response than prior designs. Spacer 45 initially keeps diaphragms 21 and 27 separated and allows rolling capacitive contact as the films 21 and 27 come into contact. Rolling contact actuation provides very high capacitive change relative to displacement and very high force for electro-static actuation. Diaphragm 21 in any embodiment has holes 33 to allow readout 53 if desired.

Figure 4:
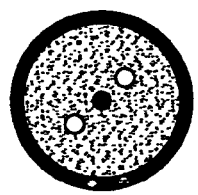
FIG. 4 is bottom view of the embodiment shown in FIG. 3.

When both diaphragms 21 and 27 are sealed and do not have any holes 35, such as when chamber elements 1 and 15 permit communication only via port 19 to a sealed system, the device of this invention serves as an absolute pressure sensor. In the second embodiment shown in FIGS. 3 and 4, pressure can be sensed on both sides of the device and may have increased sensitivity when compared to a device with only one deflecting diaphragm, such as in FIGS. 1 and 2. The device shown in FIGS. 3 and 4 also has the capability of differential sensing because diaphragms 21 and 27 will move asymmetrically if the pressures from the two sides are different.

Figure 5:
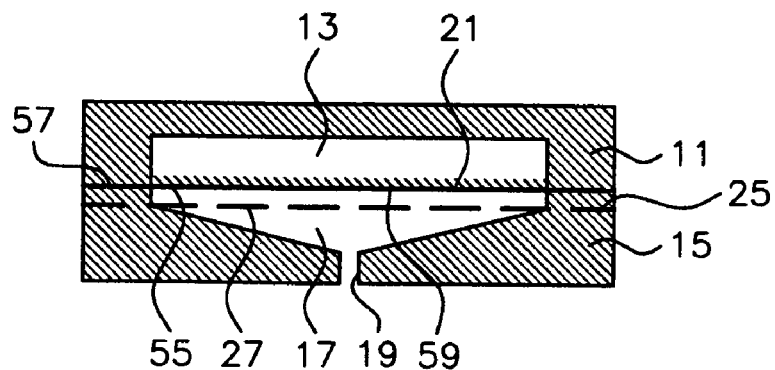
FIG. 5 is a side elevational view, in section, of one embodiment of the present invention as a cantilever style sensor.
Figure 6:
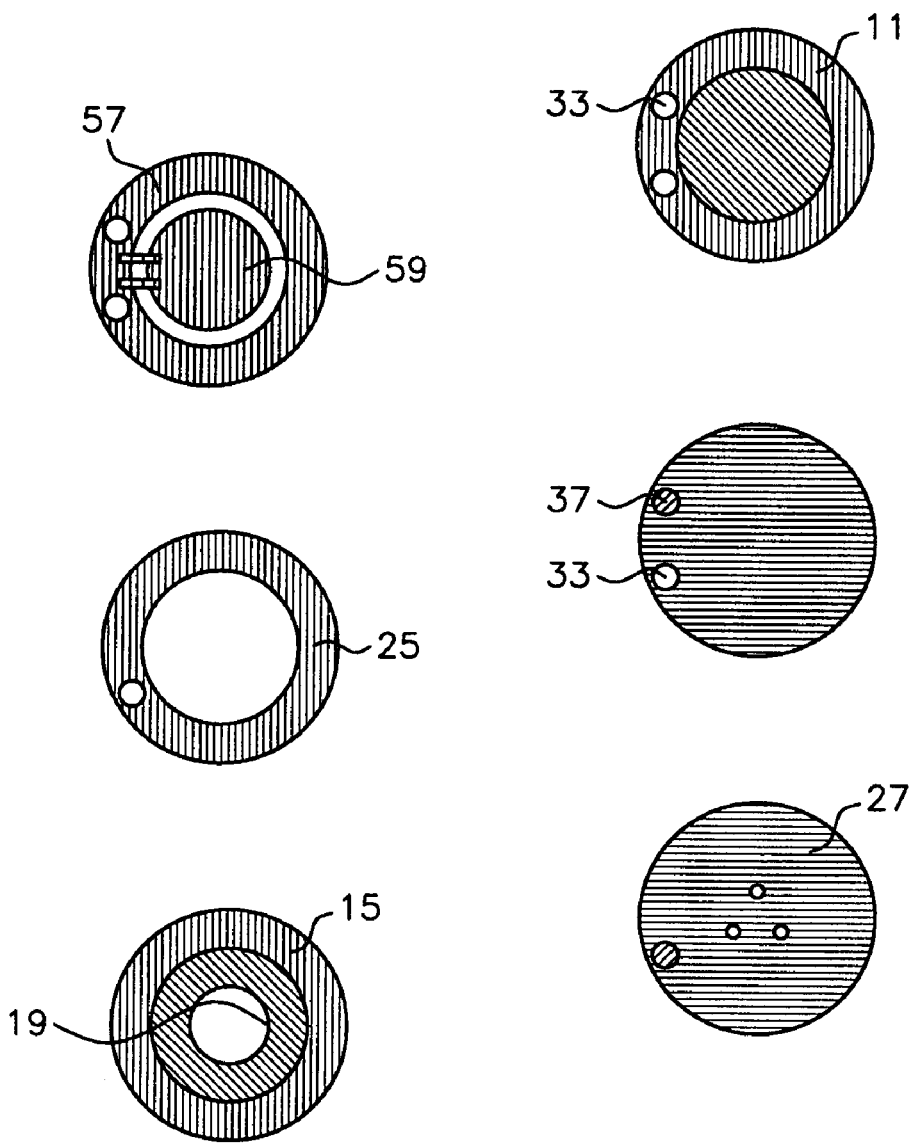
FIG. 6 is an exploded plan view of the embodiment shown in FIG. 5.

Turning now to FIGS. 5 and 6, a similar embodiment is shown with an upper chamber forming element 11 defining closed chamber 13 and a lower chamber forming element 15, to define an open chamber 17, having port 19. An upper diaphragm 21 is mounted on the closed chamber forming element 13 and lower diaphragm 27 is mounted on the lower chamber forming element 15. Spacer 55 separates diaphragms 21 and 27 as in the patent application from which this application depends. Spacer 55 is also preferably made from plastic and contains no metallization. Also included in this embodiment is cantilever 57, which supports a rigid part 59 such that cantilever 57 and rigid part 59 are located behind the deflecting diaphragm 27. Rigid element 59 converts the normal ballooning movement of a conventional deflecting diaphragm 27 into a linearly deflecting behavior.

The sensing atmosphere may be any fluid, including gases such as the atmosphere, gas pumps, chemical and electrolytic reactions, and the like or including liquids such as reactors, test devices, pumps and the like.

While particular embodiments of the present invention have been illustrated and described, they are merely exemplary and a person skilled in the art may make variations and modifications to the embodiments described herein without departing from the spirit and scope of the present invention. All such equivalent variations and modifications are intended to be included within the scope of this invention, and it is not intended to limit the invention, except as defined by the following claims.

The invention claimed is:

1. In a device for sensing pressure having a sealed chamber defining part, a first flexible diaphragm having two sides and mounted on one side in communication with said chamber in said sealed chamber defining part, said first flexible diaphragm having a conductive surface, an insulator mounted on said other side of said first flexible diaphragm, a second flexible diaphragm having two sides and mounted on one side in communication with said insulator, said second flexible diaphragm having a conductive surface, a sensor chamber defining part mounted on said other side of said second flexible diaphragm and having an opening for communication with a sensing atmosphere, whereby one of said first and second flexible diaphragms includes openings it its surface to permit fluid to flow through said openings and said other of said first and second diaphragms is solid and responds to change in pressure in said sensor chamber to move away from or toward said one of said flexible diaphragms, and electrical connections contacting said first and said second flexible diaphragms and adapted to measure the capacitance between said diaphragms as a function of said pressure in said sensor chamber introduced through said opening and causing said one flexible diaphragms to move with respect to said other of said flexible diaphragms, the improvement comprising:

a spacer element positioned between said first and second diaphragms and aligned to positions said sealed chamber part and said insulator at a non parallel angle with respect to each other to cause said first and second diaphragms to be in linearly changing contact when pressure is sensed and provide a capacitive measure of pressure.

2. The device of claim 1, which further includes an axis for said device and said spacer element positions said sealed chamber part and said insulator at an angle with respect to said axis such that said first and second flexible diaphragms are in a non-parallel alignment with each other such that deflection of one flexible diaphragm will roll with respect to said other to provide increased linear capacitive response.

3. The device of claim 2, which further includes which includes at least one opening in said surface thereof to permit said device to communicate pressure changes in pressure on the other of said first and second diaphragms.

4. The device of claim 1, wherein said spacer element comprises a non-conductive spacer element positioned between said first and second diaphragms at said center thereof to separate said diaphragms while permitting rolling contact upon displacement of at least one of said diaphragms.

5. The device of claim 4, which further includes which includes at least one opening in said surface thereof to permit said device to communicate pressure changes in pressure on the other of said first and second diaphragms.

6. The device of claim 1, said spacer element comprises a cantilever tab including a rigid polymer disc and a cantilever hinge mounted in said chamber between said first flexible diaphragm and said chamber where said first flexible diaphragm is mounted to thereby convert said first flexible diaphragm into a linearly deflecting diaphragm.

7. The device of claim 6, which further includes which includes at least one opening in said surface thereof to permit said device to communicate pressure changes in pressure on the other of said first and second diaphragms.

8. A device for sensing pressure, comprising:
a sealed chamber defining part;
a first flexible diaphragm having two sides and mounted on one side in communication with said chamber in said sealed chamber defining part, said first flexible diaphragm having a conductive surface, an insulator mounted on said other side of said first flexible diaphragm;
a second flexible diaphragm having two sides and mounted on one side in communication with said insulator, said second flexible diaphragm having a conductive surface;
a sensor chamber defining part mounted on said other side of said second flexible diaphragm and having an opening for communication with a sensing atmosphere, whereby one of said first and second flexible diaphragms includes openings it its surface to permit fluid to flow through said openings and said other of said first and second diaphragms is solid and responds to change in pressure in said sensor chamber to move away from or toward said one of said flexible diaphragms;
a spacer element positioned between said first and second diaphragms and aligned to positions said sealed chamber part and said insulator at a non parallel angle with respect to each other to cause said first and second diaphragms to be in linearly changing contact when pressure is sensed; and
electrical connections contacting said first and said second flexible diaphragms and adapted to measure the capacitance between said diaphragms as a function of said pressure in said sensor chamber introduced through said opening and causing said one flexible diaphragms to move with respect to said other of said flexible diaphragms.

9. The device of claim 8, which further includes an axis for said device and said spacer element positions said sealed chamber part and said insulator at an angle with respect to said axis such that said first and second flexible diaphragms are in a non-parallel alignment with each other such that deflection of one flexible diaphragm will roll with respect to said other to provide increased linear capacitive response.

10. The device of claim 9, which further includes which includes at least one opening in said surface thereof to permit said device to communicate pressure changes in pressure on the other of said first and second diaphragms.

11. The device of claim 8, wherein said spacer element comprises a non-conductive spacer element positioned between said first and second diaphragms at said center thereof to separate said diaphragms while permitting rolling contact upon displacement of at least one of said diaphragms.

12. The device of claim 11, which further includes which includes at least one opening in said surface thereof to permit said device to communicate pressure changes in pressure on the other of said first and second diaphragms.

13. The device of claim 8, said spacer element comprises a cantilever tab including a rigid polymer disc and a cantilever hinge mounted in said chamber between said first flexible diaphragm and said chamber where said first flexible diaphragm is mounted to thereby convert said first flexible diaphragm into a linearly deflecting diaphragm.

14. The device of claim 13, which further includes which includes at least one opening in said surface thereof to permit said device to communicate pressure changes in pressure on the other of said first and second diaphragms.

15. A device for sensing pressure, comprising:
sealed chamber defining means for defining a chamber;
first flexible diaphragm means for deflecting in said chamber and having two sides and mounted on one side in communication with said chamber in said sealed chamber defining part, said first flexible diaphragm having a conductive surface, an insulator mounted on said other side of said first flexible diaphragm;
second flexible diaphragm means for deflecting in said chamber and having two sides and mounted on one side in communication with said insulator, said second flexible diaphragm having a conductive surface,;
open sensor chamber defining means for communication with a sensing atmosphere and mounted on said other side of said second flexible diaphragm and having an opening for communication with a sensing atmosphere, whereby one of said first and second flexible diaphragm means includes openings in its surface to permit fluid to flow through said openings and said other of said first and second diaphragm means is solid and responds to change in pressure in said sensor chamber to move away from or toward said one of said flexible diaphragms;
spacer means for spacing said diaphragm means and positioned between said first and second diaphragms and aligned to positions said sealed chamber part and said insulator at a non parallel angle with respect to each other to cause said first and second diaphragm means to be in linearly changing contact when pressure is sensed; and
electrical connection means for contacting said first and said second flexible diaphragms and measure the capacitance between said diaphragms as a function of said pressure in said sensor chamber introduced through said opening and causing said one flexible diaphragms to move with respect to said other of said flexible diaphragms.

16. The device of claim 15, which further includes an axis for said device and said spacer means positions said sealed chamber means at an angle with respect to said axis such that said first and second flexible diaphragm means are in a non-parallel alignment with each other such that deflection of one flexible diaphragm means will roll with respect to said other to provide increased linear capacitive response.

17. The device of claim 16, which further includes which includes at least one opening in said surface thereof to permit said device to communicate pressure changes in pressure on the other of said first and second diaphragms.

18. The device of claim 15, wherein said spacer means comprises a non-conductive spacer element positioned between said first and second diaphragm means proximate said center thereof to separate said diaphragm means while permitting rolling of said spherical element upon displacement of at least one of said diaphragm means.

19. The device of claim 18, which further includes which includes at least one opening in said surface thereof to permit said device to communicate pressure changes in pressure on the other of said first and second diaphragms.

20. The device of claim 15, said spacer element comprises a cantilever tab including a rigid polymer disc and a cantilever hinge mounted in said chamber between said first flexible diaphragm and said chamber where said first flexible diaphragm is mounted to thereby convert said first flexible diaphragm into a linearly deflecting diaphragm.

* * * * *